(12) United States Patent
Huberman et al.

(10) Patent No.: US 12,113,894 B1
(45) Date of Patent: Oct. 8, 2024

(54) QUANTUM SECURED INTERNET TRANSPORT

(71) Applicant: CABLE TELEVISION LABORATORIES, INC., Louisville, CO (US)

(72) Inventors: Bernardo Huberman, Palo Alto, CA (US); Jing Wang, Broomfield, CO (US); Robert M. Lund, Boulder, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 278 days.

(21) Appl. No.: 17/743,377

(22) Filed: May 12, 2022

Related U.S. Application Data

(63) Continuation-in-part of application No. 17/222,478, filed on Apr. 5, 2021, now abandoned.

(60) Provisional application No. 63/246,696, filed on Sep. 21, 2021, provisional application No. 63/209,952, filed on Jun. 11, 2021, provisional application No. 63/004,624, filed on Apr. 3, 2020.

(51) Int. Cl.
*H04L 9/40* (2022.01)
*H04L 9/08* (2006.01)

(52) U.S. Cl.
CPC .......... *H04L 9/0852* (2013.01); *H04L 9/0825* (2013.01); *H04L 63/166* (2013.01)

(58) Field of Classification Search
CPC .... H04L 9/0852; H04L 9/0825; H04L 63/166
See application file for complete search history.

(56) References Cited

U.S. PATENT DOCUMENTS

| 2017/0272944 A1* | 9/2017 | Link, II | H04L 9/0841 |
| 2021/0135870 A1* | 5/2021 | Uy | H04L 9/3218 |

OTHER PUBLICATIONS

DTLS-HIMMO: Efficiently Securing a Post-Quantum World with a Fully-Collusion Resistant KPS, by Rietman et al., published 2014. (Year: 2014).*
Extension of SSL/TLS for Quantum Cryptography, by Faraj, published 2008 (Year: 2008).*

* cited by examiner

*Primary Examiner* — Vu V Tran
(74) *Attorney, Agent, or Firm* — Cozen O'Connor

(57) ABSTRACT

Systems and methods provide quantum secured internet transport. Quantum key distribution (QKD) is made universally available to existing Transport Layer Security (TLS) Internet services without requiring modification of existing applications. QKD keys may be prefetched and transferred to user devices at secure sites using QKD over an optical link (e.g., a continuous wave fiber or free-space optical link). A proxy QKD TLS tunnel client and a QKD TLS tunnel server are transparent to the user devices and select QKD keys for use with existing TLS client and TLS server services to form a QKD TLS tunnel between the user devices for secure communication. One-time-pad (OTP) encryption uses pre-shared QKD keys to provide secure OTP based encryption.

14 Claims, 7 Drawing Sheets

Quantum Key Distribution

TLS Pre-shared Keys

QKD Layer Key Management

QKD TLS Tunnel

QKD-TLS

QKD Optical Transport

Quantum Internet Router

QUANTUM SECURED INTERNET TRANSPORT

RELATED APPLICATIONS

This application is a continuation-in-part of U.S. patent application Ser. No. 17/222,478, filed on Apr. 5, 2021, which claims priority to U.S. Provisional Patent Application No. 63/004,624, filed on Apr. 3, 2020. This application also claims priority to U.S. Provisional Patent Application No. 63/209,952, titled "System and Method for Reconfigurable Relay Node for Quantum Key Distribution Networks" and filed on Jun. 11, 2021, and U.S. Provisional Patent Application No. 63/246,696, titled "Quantum Intrusion Detection Using Superdense Coding" and filed on Sep. 21, 2021. Each of these applications is incorporated herein by reference in its entirety.

BACKGROUND

Quantum computing presents a unique challenge to current Internet security. The public key infrastructure used to generate and distribute Internet transport encryption keys is particularly vulnerable to quantum algorithms that provide an exponential speed-up in discovering private keys and thereby unlocking the symmetric encryption keys that protect data communications from eavesdroppers.

SUMMARY

Quantum key distribution (QKD) provides a means to address this challenge by offering a means to generate provably secure symmetric encryption keys. QKD is a new and relatively immature quantum technology that is starting to be adopted on a trial basis by some businesses. Current QKD implementations, however, require vertical integration of a number of complex technologies that impede its widespread adoption. Integration of QKD with existing applications is proprietary, further impeding its adoption.

The embodiments herein include systems and methods that integrate QKD with existing internet and web services. With these embodiments, ISPs may offer quantum secured internet transport services which in turn may create a demand for underlying optical transport services that may be met by ISPs.

Internet encryption uses a key to encrypt data at the source and decrypt it at the destination. This is called a symmetric key. How do the source and destination derive this symmetric key? One way is to use a pre-shared key (PSK). Another way is using a public key infrastructure (PKI), such as RSA, where public and private key pairs at each site are used to derive a symmetric key. PKI is the dominant mechanism used today because PSK needs a secure way to share keys, which is not available in the Internet. The security of public/private keys is fundamentally based on the premise that it is computationally infeasible to factor large numbers. This has actually not been proven but seems true; it is known as computational security.

Unfortunately, factoring large numbers at an exponentially faster rate than on today's computers is one of the few algorithms that has been demonstrated on a quantum computer (e.g., see Quantum Annealing for Prime Factorization, by Jiang, S., Britt, K. A., McCaskey, A. J. et al. Sci Rep 8, 17667 (2018)). By snooping an encrypted Internet session from the beginning of the PKI exchange through the end of data transmission, one could in principle, with the aid of a quantum computer, decipher the data as it is sent or anytime in the future. The fact that a quantum computer does not exist today that can do the factoring at the required scale is no safeguard for data that must be kept secure into the future.

In one embodiment, a method secures Internet transport. A key manager of a first host computer at a first secure site prefetches a QKD key from a QKD layer. A QKD TLS tunnel client of the first host computer receives a request from a client application of the first host computer for secure communication with a server application of a second host computer and initiates communication with a QKD TLS tunnel server of the second host computer. A PSK identity-hint is received from the QKD TLS tunnel server and is sent to the key manager. The QKD key and a PSK identity of the QKD key is received from the key manager and the PSK identity is sent to the QKD TLS tunnel server. A secure communication channel between the client application and the server application via a QKD TLS tunnel is formed using the TLS client and the QKD key.

DETAILED DESCRIPTION OF THE EMBODIMENTS

Quantum Key Distribution

Quantum key distribution (QKD) exchanges quantum bits (qubits) between two parties to generate a symmetric key. Depending on the QKD protocol used, it can be proven that the shared key was not observed by an eavesdropper, and thus that it is provably secure. That is, when an eavesdropper attempts to detect or read the shared key, the sending and/or the receiving party is able to detect the eavesdropper. In one example protocol, Alice (the sending party) generates a random classical bit string and randomly chooses one of two agreed upon quantum basis (rectilinear and diagonal for example) to transmit each bit. Alice transmits each qubit by polarizing a photon according to the classical bit value and the chosen quantum basis. Bob (the receiving party) measures each received photon by randomly using one of the two agreed upon bases. Note that Bob measures a random value when using a different basis from the one used by Alice to transmit the qubit. Alice publicly discloses the transmitting basis used for each bit. Bob and Alice now share a subset of bits in the case where the transmitting and measurement bases are the same. Bob and Alice detect errors or eavesdropping by comparing, over a classical communication channel, the measured values of a subset of the bits where the transmission and measurement bases are the same. Depending on the QKD protocol used, it is proven that the remaining subset of shared bits cannot be observed by an eavesdropper, thus making the shared key provably secure.

The following description illustrates how QKD may be made universally available for Internet services and how QKD keys may be used for internet transport security with example applications that create and use QKD based secured transport. An interface between QKD secured transport and the underlying QKD networks are provided for example network services that facilitate further growth the quantum network. A quantum secured transport layer further illustrates demonstrates capabilities of the quantum secured transport layer, and an operational example uses QKD as a service in within metro and access networks.

Each of the following applications is incorporated herein by reference in its entirety: (1) U.S. patent application Ser. No. 17/346,130, titled "Quantum Key Distribution for Secure and Private Transactions" and filed on Jun. 11, 2021, (2) U.S. patent application Ser. No. 16/870,781, titled "Encrypted Data Transmission in Optical- And Radio-Access Networks Based on Quantum Key Distribution", filed on May 8, 2020, and now U.S. Pat. No. 11,251,947, and (3) U.S. patent application Ser. No. 16/776,265, titled "Quantum Internet Router" and filed on Jan. 29, 2020.

Figure 1:
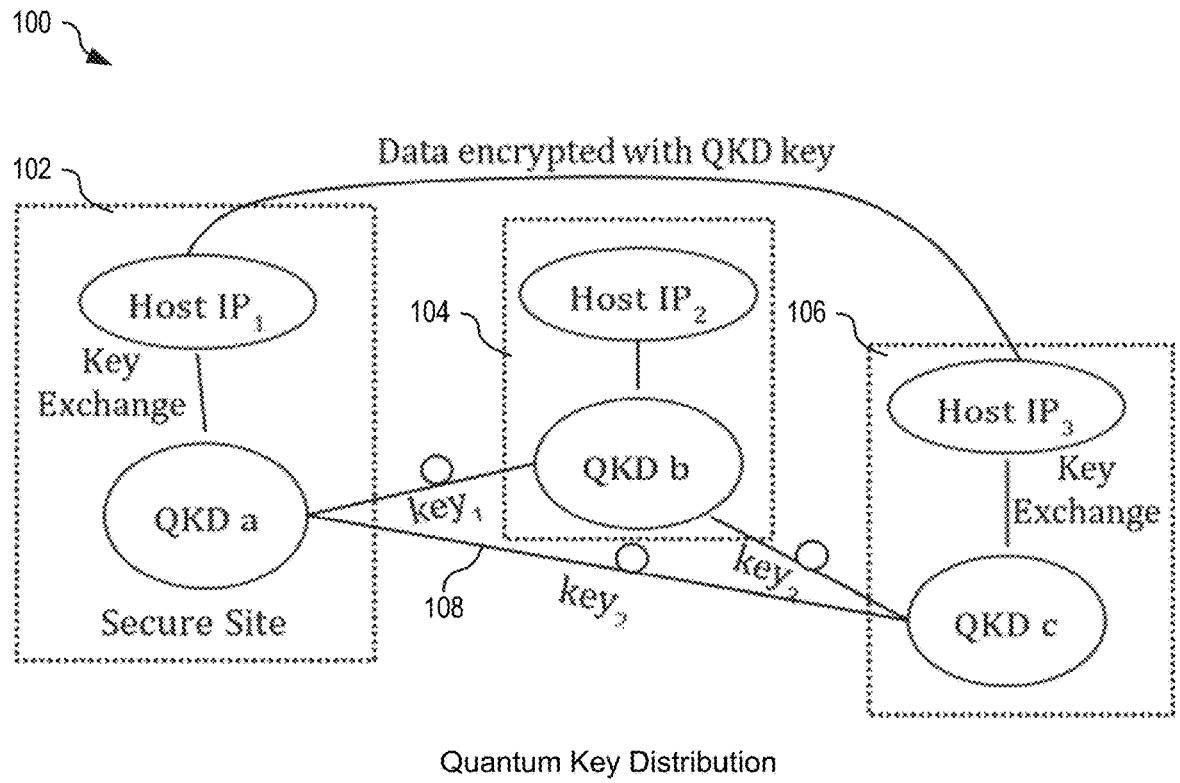
FIG. 1 shows one example quantum key distribution (QKD) network that includes three QKD nodes located at three different sites, in embodiments.

FIG. 1 shows one example QKD network 100 that includes three QKD nodes a, b, and c, located at three different sites 102, 104, and 106, respectively. QKD nodes a and c generate a shared $key_2$ over an optical link 108 (e.g., a continuous wave fiber or free-space optical link). Within secure site 102, QKD node a provides $key_2$ to a host computer Host $IP_1$ (e.g., using a conventional network that is secure within site 102). Within secure site 106, QKD node c provides $key_2$ to computer Host $IP_3$ (e.g., using a conventional network that is secure within site 106). Computers Host $IP_1$ and Host $IP_3$ each use $key_2$ to encrypt and decrypt data exchanged over an unsecured network (e.g., the Internet).

QKD solves the problem of how to generate and securely share a key between at least two host computers. Although a simple concept, the use of QKD raises a number of questions: How are QKD nodes connected by a continuous wave link? What is the format of the key exchange? And most importantly, how do existing internet and web services use QKD keys for encryption over the Internet? At present, no common practices exist that address the above questions, representing a barrier to the widespread adoption of QKD solutions.

QKD for the Internet

Embodiments herein address the following issues that need to be resolved for QKD to be universally available for internet and web services: (a) How can QKD keys be used for Internet transport security? (b) How can existing applications create and use QKD secured transport? (c) What is the interface between QKD secured transport and underlying QKD networks? and (d) What network services should be provided to facilitate creation of QKD networks?

QKD and Internet Transport Security

Figure 2:
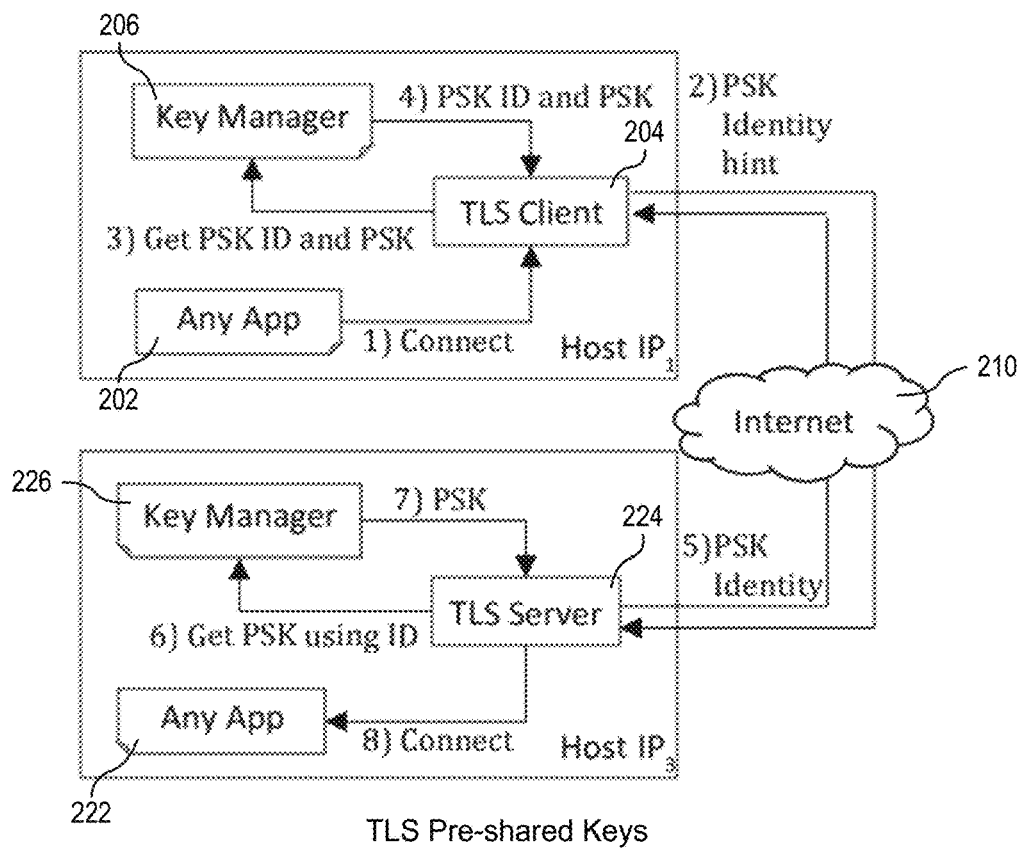
FIG. 2 is a schematic flow diagram illustrating use of pre-shared keys (PSKs) in transport layer security (TLS) for communication between a first application of a computer Host $IP_1$ and a second application running on a computer Host $IP_3$, in embodiments.

Transport Layer Security (TLS) and the deprecated Secure Sockets Layer (SSL) protocol are the basis for web services transport security used by the vast majority of web services. FIG. 2 is a schematic flow diagram illustrating use of pre-shared keys (PSKs) in TLS (hereinafter PSK TLS) for communication between a first application 202 of computer Host $IP_1$ and a second application 222 running on computer Host $IP_3$. First application 202 connects with a TLS client 204 of Host $IP_1$, which initiates communication with TLS server 224 of Host $IP_3$ via internet 210 and receives a PSK identity-hint. Based on the PSK identity-hint, TLS client 204 requests and receives a PSK identity and corresponding PSK from a key manager 206 of Host $IP_1$ and sends the PSK identity to TLS server 224. Only the PSK identity is communicated, and not the actual PSK. TLS server 224 requests and receives the corresponding PSK from a key manager 226 of Host $IP_3$ and then TLS client 204 and TLS server 224 form, using the PSK, a communication link between first application 202 and second application 222.

However, while TLS is widely used by internet and web services, several issues prevent immediate adoption of QKD of pre-shared keys (PSKs). Since there is no conventionally secure way to pre-share keys, most TLS implementations do not support PSK. Even in the case where TLS supports PSK, there is no standard method for QKD keys to be used for PSK TLS. Furthermore, there is no simple mechanism to distribute QKD keys to applications, and therefore applications are not written to make use of PSKs.

Advantageously, the following embodiments provide a method for using QKD to provide keys for use with TLS (hereinafter QKD TLS) such that QKD TLS is available to applications that do not natively support PSK TLS.

QKD PSK with TLS

With PSK TLS, generic PSKs are used in TLS. One fundamental issue is determining how a client and server agree on a common PSK when either or both have multiple PSKs that could be used. Accordingly, TLS server 224 provides a "PSK identity-hint" in the ServerKeyExchange message sent during the establishment of the TLS session. TLS client 204 selects a PSK corresponding to the PSK identity-hint. The client then includes the selected "PSK identity" in the ClientKeyExchange message sent back to the server, and the server uses the selected PSK identity to select the same PSK used by client. However, no mechanism has been defined to associate QKD keys with "PSK identity-hint" and the selected "PSK identity" information. The present embodiments solve this problem by providing the following method for associating QKD keys with "PSK identity-hint" and the selected "PSK identity" information.

The European Standard Organization ETSI defines a framework for QKD networks to make shared quantum keys available between a parent secure application entity (SAE) and a child SAE. The method specifies that:

1. The parent and child SAEs represent the TLS client and TLS server, respectively.
2. The TLS client and TLS server network addresses (either IP or fully qualified domain name) are used as the respective SAE identifier. This implies that the "Host IPx" in FIG. 1 corresponds to parent or child SAEs.
3. The nodes "QKD x" in FIG. 1 corresponds to the key management entity (KME) in the ETSI API framework.
4. The key exchange in FIG. 1 corresponds to the "Protocol Specifications" section in ETSI API framework (see FIG. 3).

5. The TLS server network address is used as the "PSK identity-hint."
6. The following JSON object is used as the "PSK identity": {keyId: keyInfo.keyId, clientId: client.addr}, where keyId is the PSK identity of the PSK selected by the TLS client and client.addr is the TLS client network address.
7. The key manager represents the key exchange functionality in FIG. 1 "Host IPx".

According to the above, steps shown in FIGS. 1 and 2, may be extended as follows. In FIG. 2, step 3, TLS client 204 invokes key manager 206 with the "PSK Identity-hint" (e.g., the child SAE network address). In FIG. 1 for the key exchange, the key manager requests PSKs with corresponding PSK Identities using the "Get key" section in the ETSI API framework where the SAE field is the "PSK Identity-hint." In FIG. 2, steps 4 and 5, the key manager selects PSK and PSK Identity and returns the JSON object described above as the "PSK Identity" to the TLS client. In FIG. 2 step 6, the key manager requests PSKs using "Get keys with key ids" section in ETSI API framework where the SAE and the key_ID fields are set to clientId and keyId properties in the JSON object described above.

Figure 3:
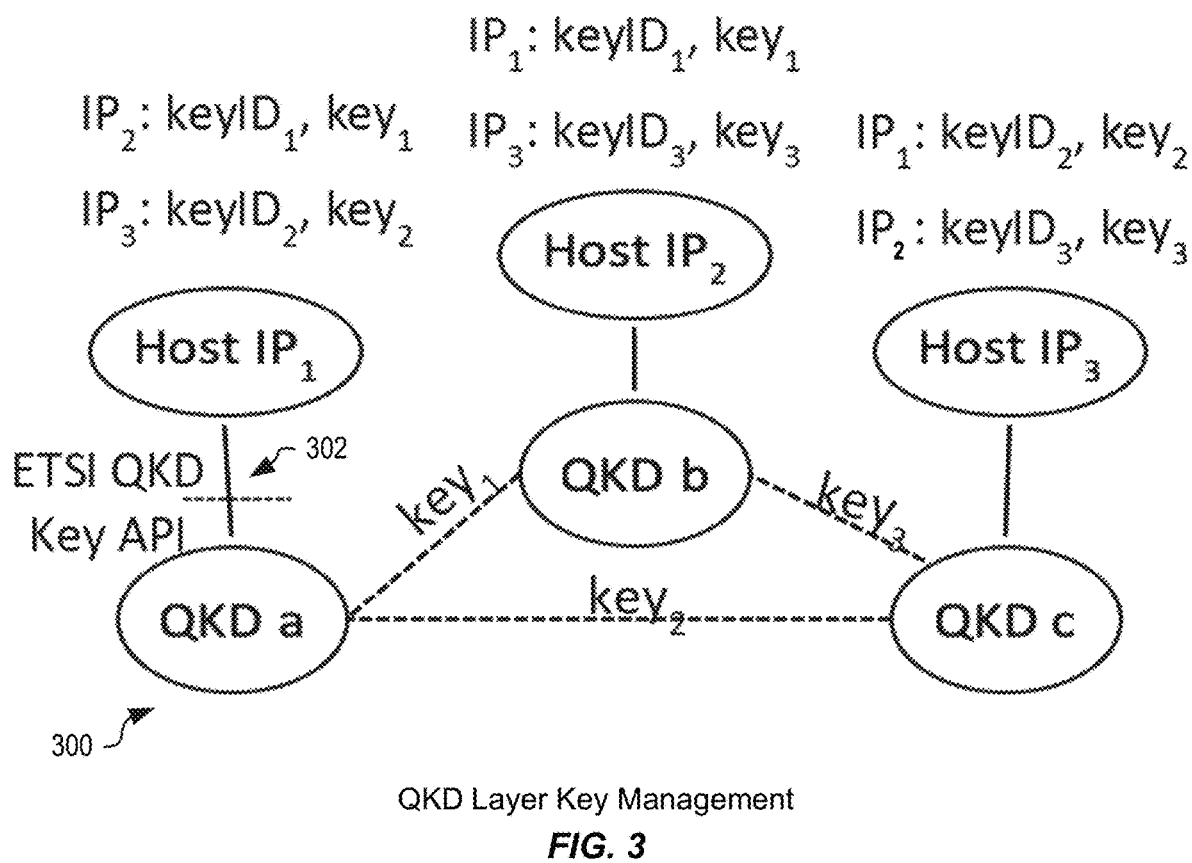
FIG. 3 shows example ETSI QKD key API implemented within key management of a QKD layer of a QKD network, in embodiments.

FIG. 3 shows one example ETSI QKD key API 302 implemented within key management of a QKD layer of a QKD network 300. The QKD layer is formed of three QKD nodes (QKD a, QKD b, and QKD c) where each node is located with a corresponding host (e.g., Host $IP_1$, Host $IP_2$, and Host $IP_3$). An important element in the design of the QKD layer key management is a key manager implementation that prefetches QKD keys from the QKD layer and makes them available on-demand for use in TLS (e.g., see steps 3 and 6 in FIG. 2). This ensures that any latency of the QKD network 300 is not seen by TLS when using QKD keys. For example, when prefetching QKD keys, two key managers communicate to generate and securely exchange new QKD keys, which they store in association with the corresponding host ID of the other key manager's host. Accordingly, as shown in FIG. 3, each key manager is aware of which other host is storing that QKD key.

In one example of operation, Host $IP_1$ and Host $IP_3$ wish to communicate. Accordingly, both Host $IP_1$ and Host $IP_3$ need to select a QKD key that is available to both hosts. As shown in FIG. 3, each Host computer (e.g., Host $IP_1$, Host $IP_2$, and Host $IP_3$) may include a table that associates QKD keys (identified as $keyID_x$) with other hosts where that QKD key is also available. In the example of FIG. 3, Host $IP_1$ associates $keyID_1$ with Host $IP_2$, since $keyID_1$ is also available in Host $IP_2$, and $keyID_2$ with Host $IP_3$ since $keyID_2$ is also available Host $IP_3$. Similarly, Host $IP_2$ associates $keyID_1$ with Host $IP_1$, and $keyID_3$ with Host $IP_3$; and Host $IP_3$ associates $keyID_2$ with Host $IP_1$, and $keyID_3$ with Host $IP_2$. Accordingly, each Host IP may determine which QKD key to select when communicating with another Host IP. For example, each key manager (see key manager 406/456 of FIG. 4) of ETSI QKD key API 302 stores a mapping between each keyID and the corresponding IP address of the host. The TLS tunnel client (or the TLS client if it supports a QKD key manager) requests a keyID for a specified IP address.

Application Support for QKD-TLS

Figure 4:
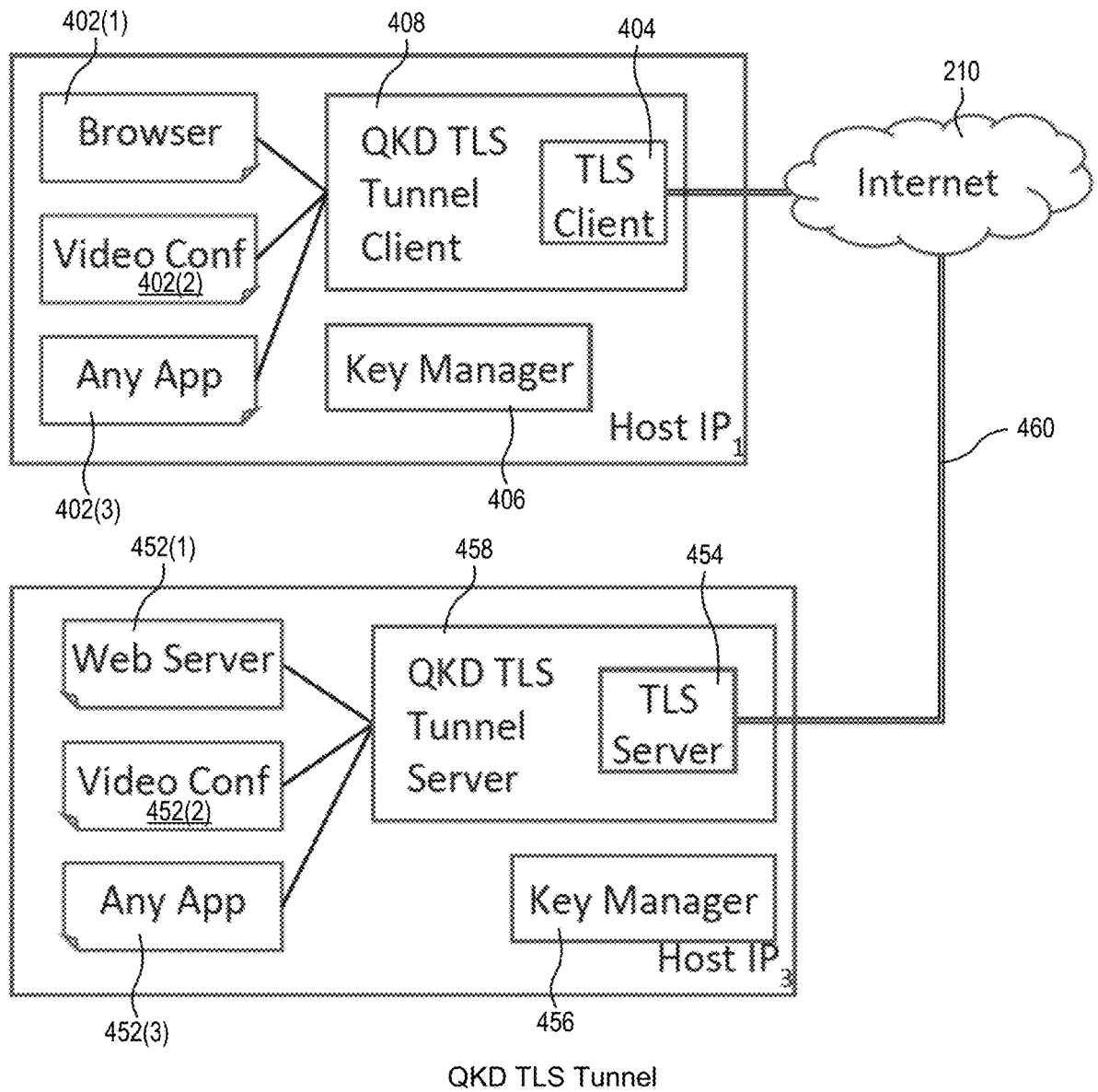
FIG. 4 is a schematic illustrating use of proxies to expose QKD PSK based TLS to existing applications, in embodiments.

The method described in the previous section enables the use of shared keys from a QKD network in applications that use TLS. However, as noted above, the use of pre-shared keys is not widely supported because there is no established means for distributing keys. Furthermore, there is no agreement on how keys from a QKD network would be made available to applications. However, a proxy, a concept widely used on the Internet, may be exploited to expose QKD PSK based TLS to existing applications in a manner transparent to those applications. FIG. 4 is a schematic illustrating use of proxies (e.g., QKD TLS tunnel client 408 and QKD TLS tunnel server 458) to expose QKD PSK based TLS to existing applications in a manner transparent to those applications. Most computing platforms provide a system wide means to redirect classes of network traffic to specified TCP/UDP ports. Specialized applications (e.g., proxies) then route that traffic as appropriate. The QKD TLS tunnel client 408 and QKD TLS tunnel server 458 are proxy applications that implement TLS functionality (e.g., similar to functionality shown in FIG. 2), by implementing the extensions defined above. As shown in FIG. 4, QKD TLS tunnel client 408 is a proxy that interfaces with one or more client applications 402 (e.g., browser application 402(1), video conference application 402(2), and any other application 402(3)) and TLS client 404. Advantageously, by implementing QKD TLS tunnel client 408 as a proxy, client applications 402 do not require modification to take advantage of QKD TLS. Similarly, within Host $IP_3$, QKD TLS tunnel server 458 is a proxy that interfaces with one or more server applications 452 (e.g., web server 452(1), video conference application 452(2), and any other server application 452(3)) and TLS server 454. Advantageously, by implementing QKD TLS tunnel server 458 as a proxy, server applications 452 do not require modification to take advantage of QKD TLS.

In one example of operation, network traffic from existing client applications 402 and server applications 452 connect with QKD TLS tunnel client 408 and QKD TLS tunnel server 458, which communicate with each other using a QKD-TLS tunnel 460 that is setup over Internet 210. In this way, the existing, unmodified applications may take advantage of QKD TLS across the Internet.

Figure 5A:
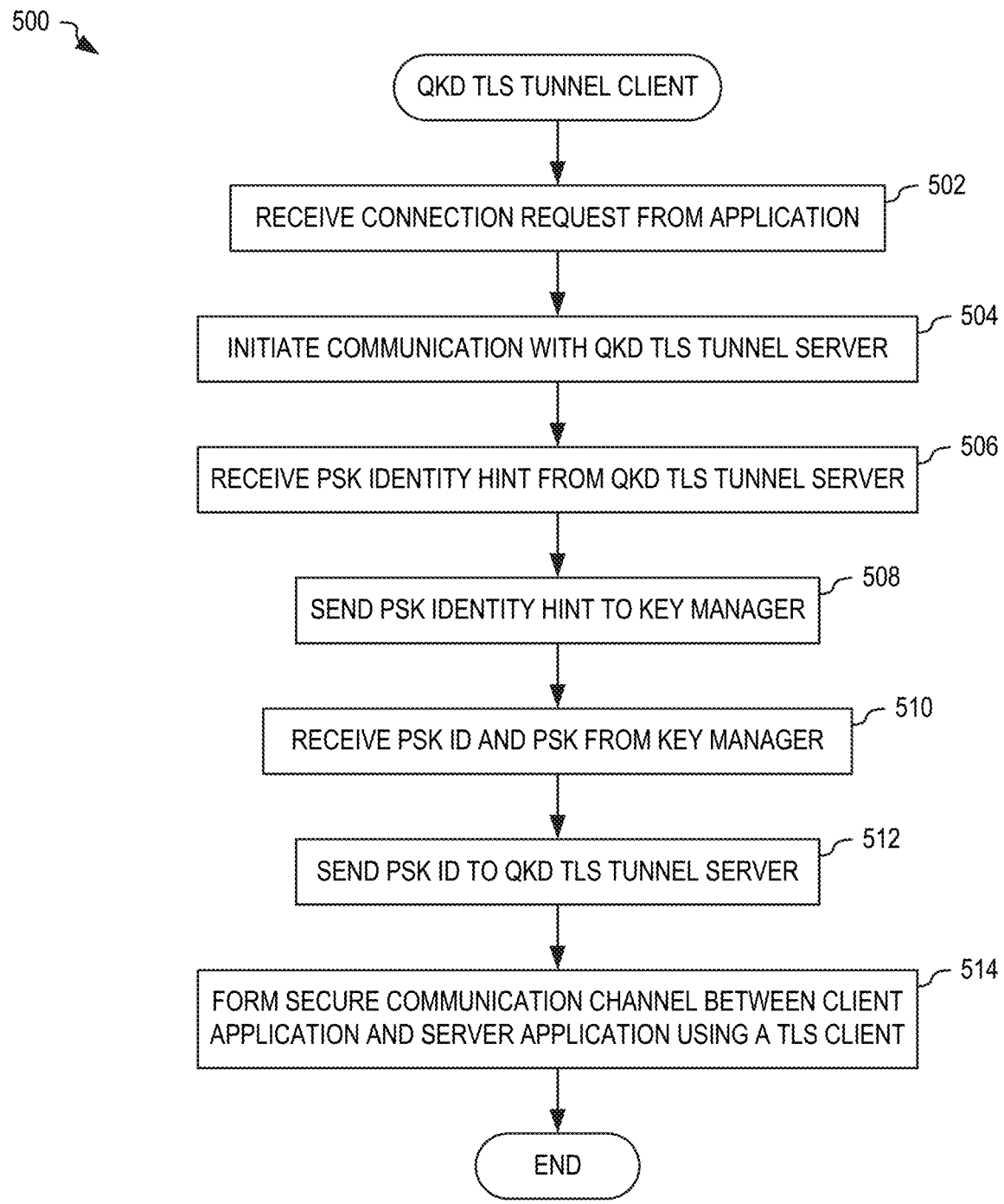
FIGS. 5A and 5B are flowcharts illustrating example methods for supporting QKD PSK based TLS, in embodiments.

FIG. 5A is a flowchart illustrating one example method 500 for supporting QKD PSK based TLS. Method 500 is implemented within QKD TLS tunnel client 408, for example. In block 502, method 500 receives a connection request from a client application. In one example of block 502, QKD TLS tunnel client 408 receives a communication request from browser application 402(1). In block 504, method 500 initiates communication with the corresponding QKD TLS tunnel server. In one example of block 504, QKD TLS tunnel client 408 of Host $IP_1$ initiates communication with QKD TLS tunnel server 458 of Host $IP_3$. In block 506, method 500 receives a PSK identity-hint from the QKD TLS tunnel server. In one example of block 506, QKD TLS Tunnel client 408 receives a PSK identity-hint from QKD TLS tunnel server 458.

In block 508, method 500 sends the PSK identity-hint to a key manager. In one example of block 508, QKD TLS tunnel client 408 sends the received PSK identity-hint to a key manager 406 of Host $IP_1$. In block 510, method 500 receives a PSK ID and a PSK from the key manager. In one example of block 510, key manager 406 uses the PSK identity-hint (e.g., an IP address of Host $IP_3$) to identify $keyID_2$ and select $key_2$ which it sends to QKD TLS Tunnel client 408. In block 512, method 500 sends the PSK ID to QKD TLS tunnel server. In one example of block 512, QKD TLS tunnel client 408 sends $keyID_2$ to QKD TLS tunnel server 458. In block 514, method 500 forms a secure communication channel between the client application and the server application. In one example of block 514, QKD TLS tunnel client 408 and QKD TLS tunnel server 458 use key$_2$ to form QKD-TLS tunnel 460 to allow secure communication between client application 402 and server application 452.

Figure 5B:
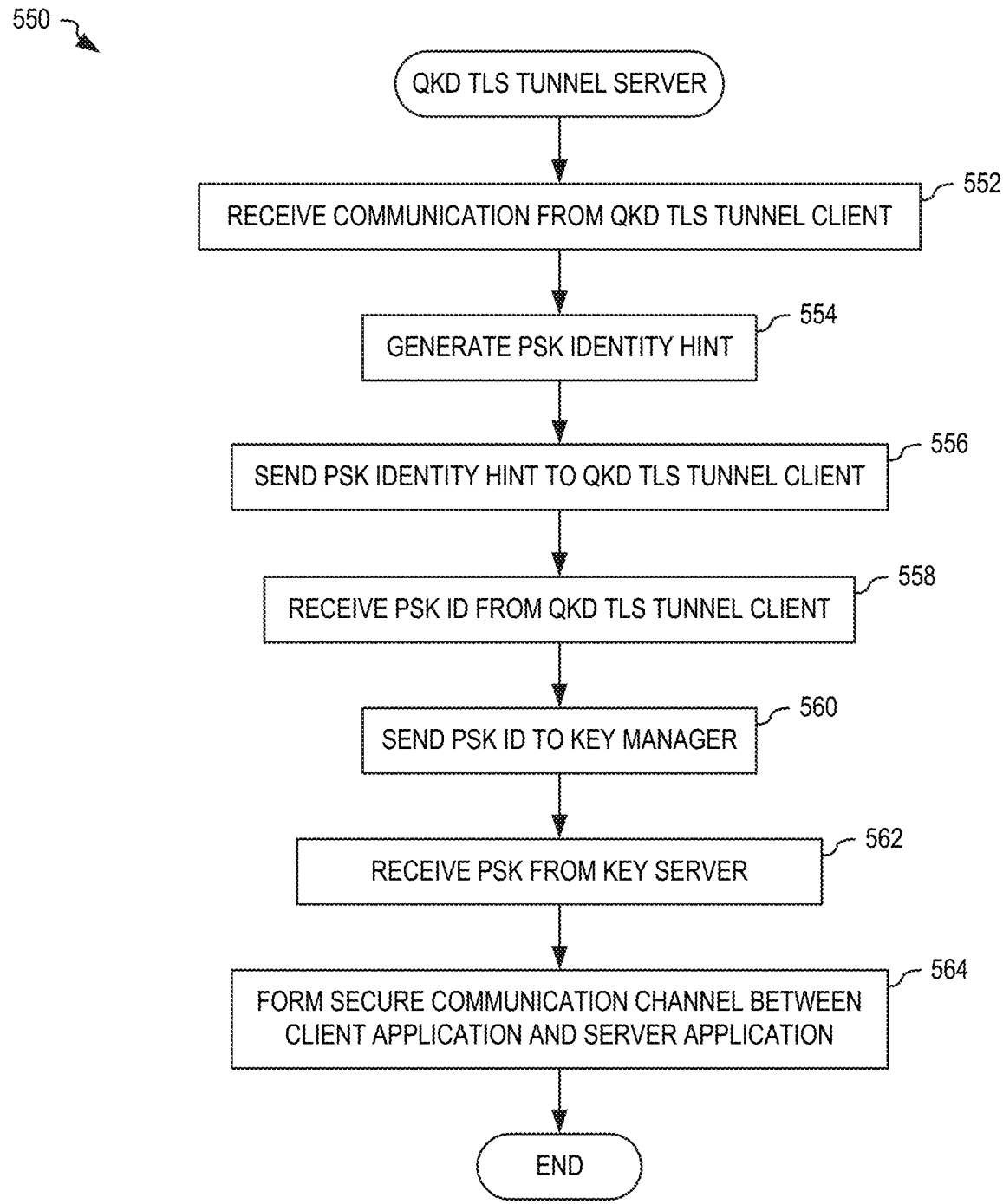

FIG. 5B is a flowchart illustrating one example method 550 for supporting QKD PSK based TLS. Method 550 is implemented within QKD TLS tunnel server 458, for example. In block 552, method 550 receives a communication request from a QKD TLS tunnel client. In one example of block 552, QKD TLS tunnel server 458 receives a communication request from QKD TLS tunnel client 408. In block 554, method 550 generates a PSK identity-hint. In one example of block 554, QKD TLS tunnel server 458 of Host IP$_3$ generates a PSK identity-hint including the child SAE network address (e.g., an IP address of Host IP$_3$). In block 556, method 550 sends the PSK identity-hint to the QKD TLS tunnel client. In one example of block 556, QKD TLS tunnel server 458 sends the PSK identity-hint to QKD TLS tunnel client 408. In block 558, method 550 receives a PSK Key ID from the QKD TLS tunnel client. In one example of block 558, QKD TLS tunnel server 458 receives keyID$_2$ from QKD TLS tunnel client 408.

In block 560, method 550 sends the received PSK ID to a key manager. In one example of block 560, QKD TLS tunnel server 458 sends keyID$_2$ to key manager 456. In block 562, method 550 receives a PSK from the key manager. In one example of block 562, QKD TLS Tunnel server 458 receives key$_2$ from key manager 456. In block 564, method 550 forms a secure communication channel between the client application and the server application. In one example of block 564, QKD TLS tunnel client 408 and QKD TLS tunnel server 458 use key$_2$ to form QKD-TLS tunnel 460 to allow secure communication between client application 402 and server application 452.

A QKD TLS Proof-of-Concept System

Figure 6:
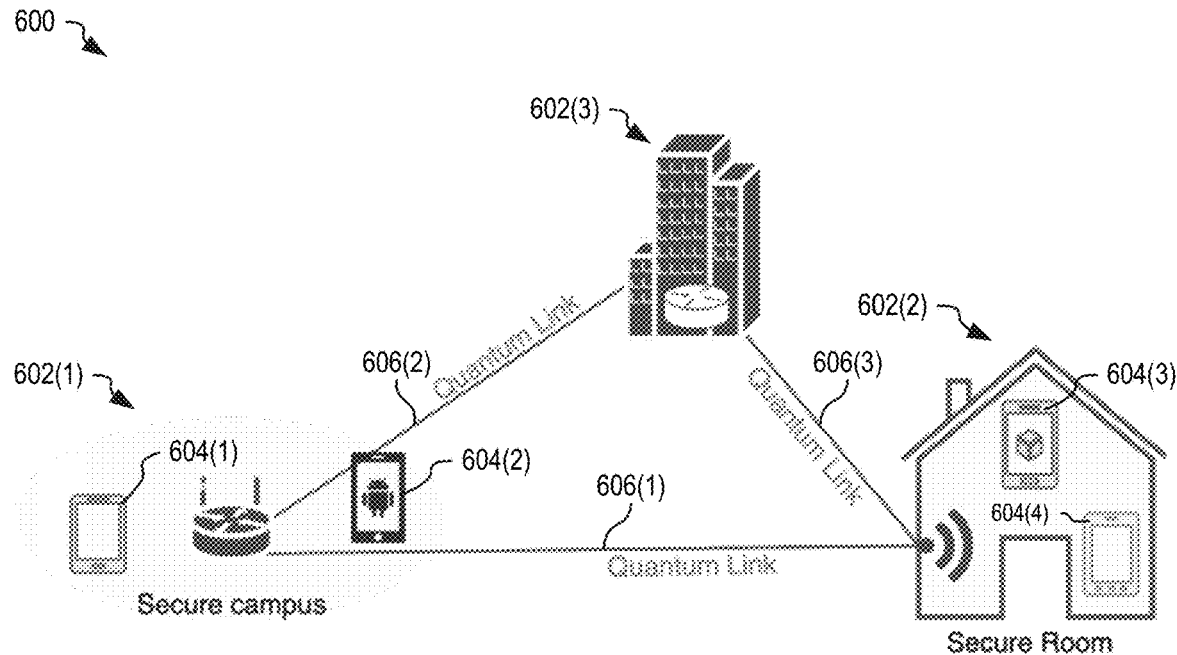
FIG. 6 is a schematic illustrating one example communication network protected by QKD, in embodiments.

A proof of concept (POC) of the QKD TLS system described in the previous sections was developed at CableLabs. FIG. 6 is a schematic illustrating one example communication network 600 protected by QKD. Since current technology only allows QKD using photons, communication between two secure sites 602 (e.g., a secure campus 602(1), a secure room 602(2), and a secure building 602(3)) is implemented using an optical fiber or a free space optics link 606. As shown in FIG. 6, link 606(1) connects secure campus 602(1) and secure room 602(2), link 606(2) connects secure campus 602(1) and secure building 602(3), and link 606(3) connects secure room 602(2) and secure building 602(3). It is impossible to practically connect all devices requiring secure communication using optical fiber or free space optics communication links, and therefore wireless access, due to its ubiquity and flexibility, is used for key distribution within the last segment of networks. That is, a hybrid key delivery architecture is used to distribute QKD keys, where long distance fibers allow QKD keys to be securely exchanged between secure sites, and within each secure site, wireless communication is used to transfer the QKD keys to client devices 604.

Secure sites 602(1) and 602(2) may represent secure sites 102, 104, and 106 of FIG. 1, such as any one or more of a bank building, a business campus, and a government office, that are connected by optical fibers and may thus benefit from QKD. The wireless communication within each secure site 602 may use conventional cryptography; however, other methods may also be employed to ensure secure distribution of QKD keys to client devices 604 at each secure site 602. For example, communication may be confined to secure site 602 by using one or more of free-space-optics, visible light communication, and directional millimeter wave beams, since these technologies do not penetrate walls of the buildings and campuses. In contrast, the whole communication link of legacy networks must be secured from end to end to provide secure distribution of keys. However, since QKD is secure, the hybrid key delivery architecture only requires that each secure site 602 be protected to ensure secure distribution of the QKD keys to client devices. It is easier to secure each site 602 as compared to securing the entire network infrastructure between sites.

This hybrid key delivery architecture may be used as a first phase deployment of security-as-a-service. Different granularities of securities are realized by this hybrid key delivery architecture. For example, absolute security is realized over long distances between secure sites and computational security is realized over short distance within each secure site where security is traded for mobility and flexibility.

Figure 7:
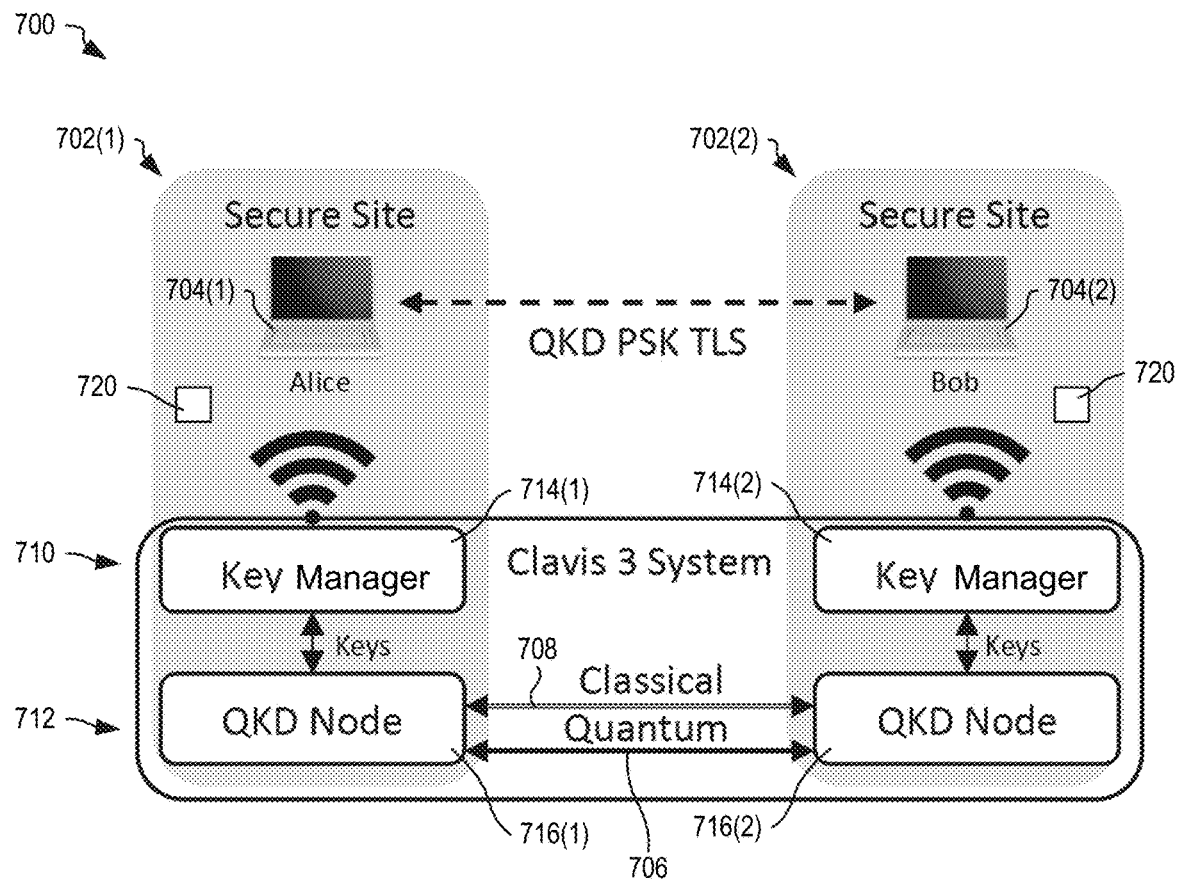
FIG. 7 is a schematic illustrating one example QKD-TLS system using QKD for transferring QKD keys between two secure sites to allow two mobile devices to use those QKD keys for QKD PSK TLS, in embodiments.

FIG. 7 is a schematic illustrating one example QKD-TLS system 700 using QKD for transferring QKD keys between two secure sites 702(1) and 702(2) to allow two mobile devices 704(1) and 704(2) to use those QKD keys for QKD PSK TLS (e.g., using QKD-TLS tunnel 460 of FIG. 4) to provide secure communication between the two mobile devices 704(1) and 704(2).

In one example, secure sites 702(1) and 702(2) are geographically separated (e.g., by 25 km) and connected by a QKD channel 706 (e.g., a continuous wave fiber or free-space optical link) and a classical channel 708 (e.g., the Internet) carrying traditional traffic between the two sites 702 and serving as an auxiliary channel for QKD. The QKD-TLS tunnel is implemented using NodeJS v13.6, which is a widely deployed web services platform where v13.6 is the first version implementing PSK TLS. QKD-TLS system 700 includes a key management layer 710 formed by key manager 714(1) located at secure site 702(1) and key manager 714(2) located at secure site 702(2), and a quantum layer 712 formed by QKD node 716(1) located at secure site 702(1) and QKD node 716(2) located at secure site 702(2). Key management layer 710 implements the ETSI QKD key management API (see ETSI QKD key API 302 of FIG. 3), as described above. Quantum layer 712 may include truly random bit generation and quantum key distribution and may be based on ID Quantique Clavis 3 QKD. After exchanging QKD keys, both sites 702(1) and 702(2) store the QKD keys in key managers 714(1) and 714(2), respectively. Mobile devices 704(1) and 704(2) (e.g., used by Alice and Bob) may fetch the QKD key 720 from their respective key managers 714 for use in protecting communication between mobile devices 704(1) and 704(2). Using the versatility of TLS, internet traffic, such as simple web browsing, video streaming and WebRTC video and text chat etc., may be transported over a QKD-TLS tunnel formed using the retrieved QKD key 720. Furthermore, after retrieving the QKD key 720 from the key managers 714 at the secure sites 702, mobile devices 704 are not required to remain at the secure sites to use the QKD key 720 and may communicate using the QKD key 720 when roaming away from secure sites 702. Once the retrieved QKD key 720 is consumed, mobile device 704 may return to secure site 702 to retrieve new QKD keys from key manager 714. For example, each mobile device 704 may retrieve multiple QKD keys for future use.

QKD Networks as a Service

Deploying a QKD network, such as QKD network 300 of FIG. 3, requires a continuous wavelength optical connection between QKD nodes. Further, quantum mechanics precludes optical amplification of optical channels that carry qubits.

Accordingly, in the near-term, QKD deployments are limited to maximum distances of approximately one-hundred miles between QKD nodes. QKD has the notion of a QKD trusted repeater that chains together QKD point-to-point links, thereby overcoming the optical limit in the future. However, use of a third-party trusted repeater would appear to introduce a security vulnerability that seems at odds with any security requirements necessitating the use of QKD.

Thus, an ISP metro QKD service may provide on-demand point-to-point optical connections with the required fidelity via wavelength switches or reconfigurable optical add/drop multiplexers (ROADM).

Figure 8:
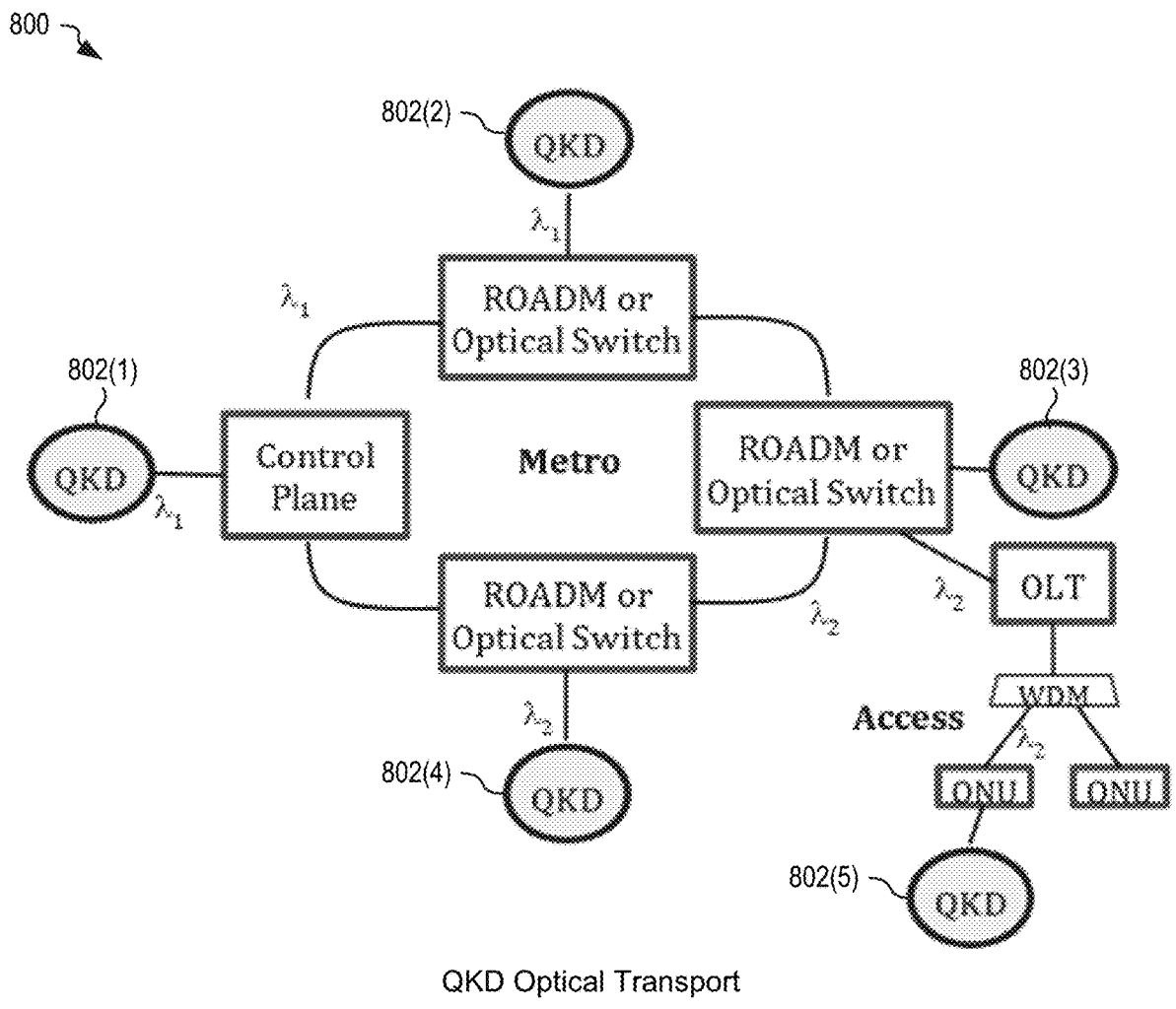
FIG. 8 shows one example ISP metro QKD service that interconnects four QKD nodes in a metro area and a fifth QKD node via a passive optical network (PON), in embodiments.

This ISP metro QKD service may be further improved by using novel ways of delivering quantum keys over the optical access network. Specifically, QKD may be integrated into passive optical networks (PON), that enable the delivery of QKD keys to end users exploiting the fiber deep architecture of cable networks. This also allows reuse of classical infrastructure for QKD, with the ensuing reduction in system costs. FIG. 8 shows one example ISP metro QKD service 800 that interconnects four QKD nodes 802(1)-(4) in a metro area and a fifth QKD node 802(4) via a passive optical network (PON). In the example of FIG. 8, À, identifies a wavelength over which the quantum channels (e.g., between hosts of QKD network 300 of FIG. 3) are carried, where each wavelength carries a single quantum channel between 2 endpoints. Accordingly, a network provider may facilitate QKD deployment through components of an optical network.

Figure 9:
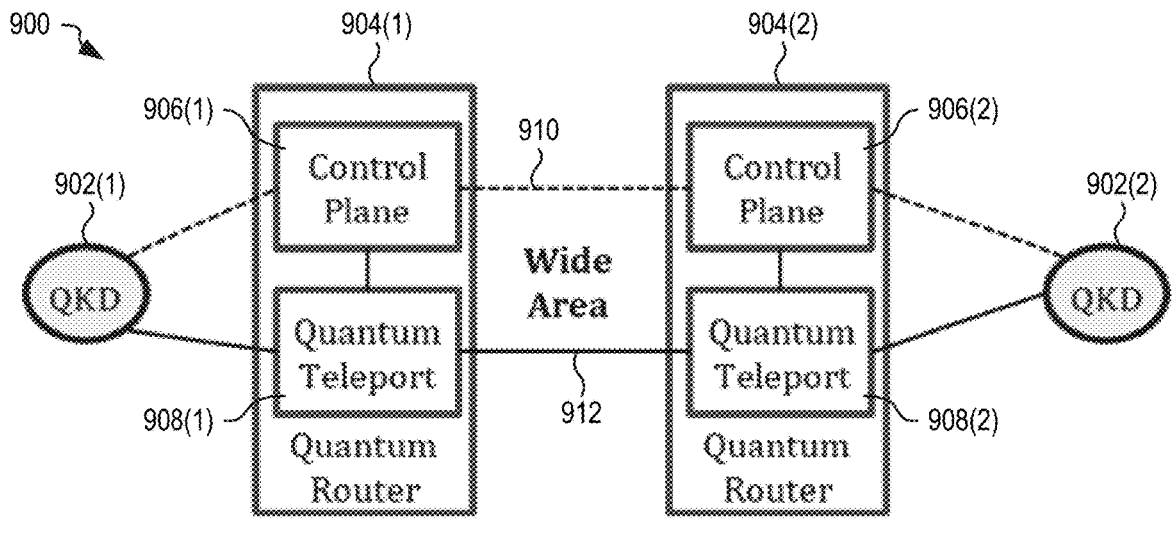
FIG. 9 illustrates example use of two quantum routers for enabling a true quantum Internet, in embodiments.

Longer range qubit transmission is possible but requires using quantum entanglement and repeaters. Adding a control plane results in a quantum router which enables a true quantum Internet. FIG. 9 illustrates example use of two quantum routers for enabling a true quantum Internet 900. Further detail on Quantum routers is found in a paper titled "A Quantum Router for the Entangled Web" by Bernardo Huberman and Bob Lund, incorporated herein by reference. As shown in FIG. 9, a QKD node 902(1) communicates with QKD node 902(2) via quantum router 904(1) and quantum router 904(2). Quantum router 904(1) includes a control plane 906(1) and a quantum teleport 908(1). Similarly, quantum router 904(2) includes a control plane 906(2) and a quantum teleport 908(2). Control plane 906(1) communicates with control plane 906(2) via a classical communication channel 910 (e.g., the Internet). Quantum teleport 908(1) communicates with quantum teleport 908(2) via a QKD channel 912. Advantageously, through use of quantum routers 904, true quantum Internet 900 may operate over a wider area as compared to ISP metro QKD service 800 of FIG. 8.

Perfect Security with QKD

Using pre-shared QKD keys instead of symmetric keys derived from PKI makes TLS much more resistant to a quantum computer exploiting Shor's algorithm. However, the underlying symmetric encryption algorithm used, AES for example, is still only computationally secure. Perfect (e.g., provable) encryption security may be achieved by using the one-time-pad (OTP) encryption with pre-shared QKD keys. OTP is an encryption technique that uses a one-time pre-shared key the same length as the message being sent. Each character of the message to be sent is encrypted by using a certain operation and a corresponding character of the OTP. Decryption is done using a reverse operation and the same character of the OTP on the encrypted message character.

As described above, QKD solves the problem of securely sharing a key in a provably secure manner. In this example, two entities, Alice and Bob, wish to communicate securely. A perfectly random shared key may be generated in one of two ways. In a first method, Alice uses one of several commercially available quantum mechanisms to create a random key, and then shares the random key via QKD. In a second method, Alice creates two strings of qubits in the |0> state, entangle each pair of qubits (one from each string), and then share one string of entangled qubits with Bob via QKD. If the proper quantum entanglement circuit is used, Alice and Bob each measures their entangled string, which results in a correlated random string. QKD key distribution shown in FIG. 3 may be used to create a random PSK for OTP. A perfectly random OTP of any length may be formed by using the shared sequence of (keyID1, key1), . . . (keyIDn, keyn). Alice uses her copy of the OTP to encrypt a message, then sends the sequence of keyIDs to Bob, who uses the associated sequence of keys, to decrypt the message. To use an OTP in the QKD PSK based TLS of FIG. 4, TLS (e.g., TLS client 404 and TLS server 454) is extended to implement the OTP XOR algorithm and TLS client 404 is extended to use a sequence of QKD keys to encrypt the message and to send the associated sequence of keyIDs to TLS server 454 such that the message may be decrypted. Unfortunately, these changes are not straightforward to implement. However, since the OTP XOR operation is simple, an interim approach replaces TLS client 404 and TLS server 454 with a specialized OTP client and OTP server that share a signaling channel to exchange the sequence of keyIDs. The application interface to QKD TLS tunnel client 408 and QKD TLS tunnel server 458 remains the same in either case. This provides a path for starting with the interim solution and then migrating to the OTP integrated in TLS solution.

Advantageously, some of the embodiments described herein allow QKD symmetric keys to be used with TLS to provide quantum computing resistant security for existing internet applications. These embodiments also provide a hybrid key delivery architecture that allow for wirelessly distributing QKD keys within secure sites. These embodiments also evolve QKD-TLS tunnels to use a quantum key based one-time-pad to provide perfectly secure internet transport.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A method for secured Internet transport, comprising:
   prefetching, by a key manager of a first host computer at a first secure site, a quantum key distribution (QKD) key from a QKD layer;
   receiving, within a QKD transport layer security (TLS) client of the first host computer, a request from a client application of the first host computer for secure communication with a server application of a second host computer;
   initiating communication with a QKD TLS server of the second host computer;
   receiving, from the QKD TLS server, a pre-shared key (PSK) identity-hint;
   sending the PSK identity-hint to the key manager;
   receiving the QKD key and a PSK identity of the QKD key from the key manager;

sending the PSK identity to the QKD TLS server; and
forming a secure communication channel between the client application and the server application via QKD TLS using the QKD TLS client and the QKD key.

2. The method of claim 1, further comprising using a QKD TLS tunnel client proxy with a conventional TLS client to implement the QKD TLS client.

3. The method of claim 1, wherein prefetching comprises using a quantum channel to exchange quantum bits between the key manager and a second key manager of the QKD layer.

4. The method of claim 1, storing, by the key manager, the QKD key in association with a host identity of the second host computer.

5. The method of claim 4, the host identity comprising a network address of the second host computer.

6. The method of claim 4, the second host computer having a secure application entity that is defined by a framework for QKD networks of the European Standard Organization.

7. The method of claim 1, wherein the PSK identity is a JavaScript Object Notation (JSON) object storing an identity of the QKD key and a network address of the second host computer.

8. A method for secured Internet transport, comprising:
prefetching, by a key manager of a first host computer at a first secure site, a quantum key distribution (QKD) key from a QKD layer;
receiving, by a quantum key distribution (QKD) transport layer security (TLS) server at the first host computer from a QKD TLS client at a second host computer, a request from a client application of the second host computer for secure communication with a server application of the first host computer;
generating a pre-shared key (PSK) identity-hint in response to the request;
sending the PSK identity-hint to the QKD TLS client;
receiving a PSK identity from the QKD TLS client;
sending the PSK identity to a key manager of the first host computer;
receiving a QKD key from the key manager; and
forming a secure communication channel between the server application and the client application via QKD TLS using the QKD TLS server and the QKD key.

9. The method of claim 8, further comprising using a QKD TLS tunnel server proxy with a conventional TLS server to implement the QKD TLS server.

10. The method of claim 8, wherein prefetching comprises using a quantum channel to exchange quantum bits between the key manager and a second key manager of the QKD layer.

11. The method of claim 8, further comprising storing, by the key manager, the QKD key in association with a host identity of the second host computer.

12. The method of claim 11, the host identity comprising a network address of the second host computer.

13. The method of claim 11, the second host computer having a secure application entity that is defined by a framework for QKD networks of the European Standard Organization.

14. The method of claim 8, wherein the PSK identity is a JavaScript Object Notation (JSON) object storing an identity of the QKD key and a network address of the second host computer.

* * * * *